United States Patent [19]
McCurry et al.

[11] Patent Number: 5,620,188
[45] Date of Patent: Apr. 15, 1997

[54] ROUTER COLLET

[75] Inventors: Ronald C. McCurry, West Union; Wallace E. Anderson, Pickens, both of S.C.

[73] Assignee: Ryobi North America, Easley, S.C.

[21] Appl. No.: 555,266

[22] Filed: Nov. 8, 1995

[51] Int. Cl.⁶ .................................................. B23B 31/20
[52] U.S. Cl. ................. 279/48; 279/56; 409/234
[58] Field of Search .................. 279/48, 49, 47, 279/50, 56, 57; 409/182, 234

[56] References Cited

U.S. PATENT DOCUMENTS

| | | |
|---|---|---|
| 1,372,482 | 3/1921 | Clare .......................................... 279/48 |
| 1,409,311 | 3/1922 | Olson . | |
| 3,553,753 | 3/1968 | Hundley . | |
| 3,734,513 | 5/1973 | Kanebako et al. ........................ 279/56 |
| 3,765,074 | 10/1973 | Payne . | |
| 4,385,854 | 5/1983 | Miyakawa ............................... 408/127 |
| 4,817,972 | 4/1989 | Kubo ........................................ 279/42 |
| 5,096,213 | 3/1992 | Terwilliger et al. ...................... 279/51 |

Primary Examiner—Steven C. Bishop
Attorney, Agent, or Firm—Brooks & Kushman P.C.

[57] ABSTRACT

A router collet for removably attaching a rotary cutting tool to a router drive shaft is provided having a body, a split collet, a nut and a retainer for retaining the collet and nut together to permit free rotation while limiting axial movement therebetween. This construction enables the nut when loosened to initially rotate with the split collet and cutting tool for limited axial distance whereupon further axial movement of the collet is constrained causing the split collet and nut to separate and the split collet to loosen its grip upon the cutting tool shank.

18 Claims, 2 Drawing Sheets

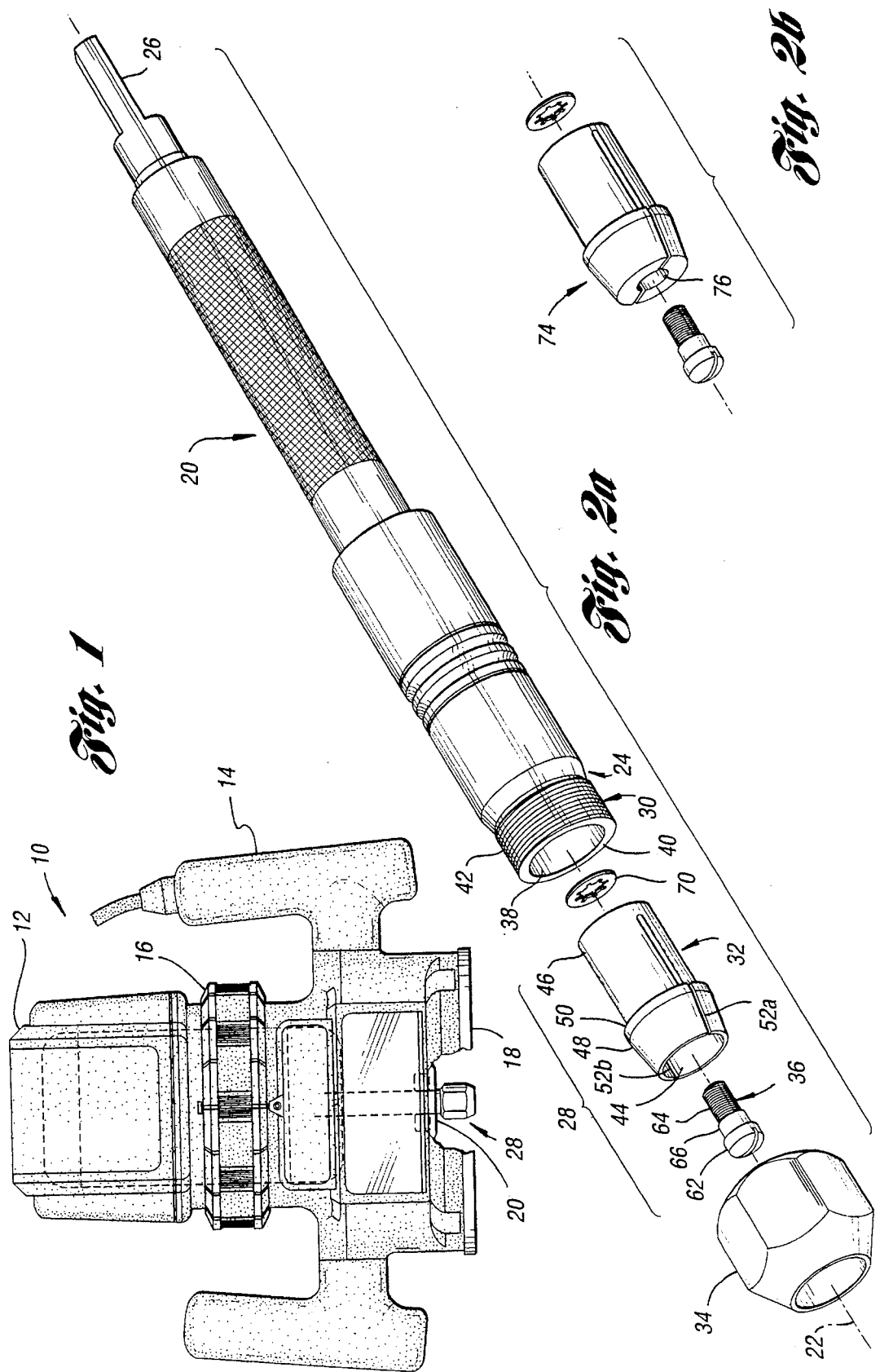

ROUTER COLLET

TECHNICAL FIELD

This invention relates to router collets of the type having a discrete split collet cooperating with and interposed between a body member and a nut.

BACKGROUND OF THE INVENTION

A wide variety of collets are utilized on routers in order to removably affix a rotary cutting tool to the router drive shaft. Router collets can be classified in two main categories. Collets which are integrally formed as part of the drive shaft, and collets which are a discrete separate element which are trapped between and cooperate with the drive shaft and a nut.

A problem associated with router collets utilizing a discrete collet element design is that the collet once tightened securely grips both the shank of the cutting tool and the cooperating frusto-conical surface which can be formed either in the collet nut or in the body member oriented on the end of the drive shaft. In spite of the nut being loosened, the collet and cooperating frusto-conical surface remain locked together. In order to remove the cutting tool it is typically necessary to tap the cutter or to dislodge the discrete collet and cooperating member.

An object of the present invention is to provide a router collet assembly having a discrete collet which automatically releases the rotary cutting tool enabling the tool to be freely removed and replaced once the collet nut is rotated in an unloosening direction relative to the body at a predetermined distance.

SUMMARY OF THE INVENTION

Accordingly, a router collet assembly of the present invention is provided for attaching a removable router cutting tool to an elongated router drive shaft which is rotated about a central axis. The collet assembly is made up of three principal elements: a body member, a split collet and a nut. A retainer for retaining the collet and body together while permitting free rotation about a central axis and limited axial movement wherein the body can initially move rotationally and axially a limited distance with the nut as the nut is loosened before the retainer limits further axial movement causing the nut and collet to separate and the collet's grip on a cutting tool shank to be released.

Preferably, the body of the present invention is driven by the drive shaft end and is provided with a generally cylindrical circular cavity formed therein concentric with the drive shaft central axis. The body further includes an end face surrounding the cylindrical cavity and a threaded outer peripheral surface. The split collet is provided with a cylindrical bore sized to receive a cylindrical shank of a cutting tool. The split collet has a first end portion sized to slip fit into the body circular cavity and a second end portion provided with a tapered frusto-conical outer surface, and an annular shoulder intermediate the first and second end portions for abuttingly cooperating with a body end face. The nut has an axial bore extending therethrough having an internal threaded region for cooperating with the body threaded surface and an internal frusto-conical surface for cooperating with the collet frusto-conical outer surface. The rotation of the nut relative to the body in a tightening direction causes a nut to engage the collet constricting in the collet bore to grip the shank of the cutting tool.

Two embodiments of the invention are disclosed, one having an elongate split collet having an end plate affixed to the split collet first end portion and having a central aperture formed therein. A threaded axial bore is formed in the body within the generally circular cylindrical cavity. A threaded fastener forms a retainer. The threaded fastener has a head for cooperating with the split collet end plate and a threaded region for affixing the threaded fastener to the threaded bore of the body. The fasteners enlarged head is located such that the collet is free to rotate relative to the body and has a limited axial movement.

A second embodiment of the collet is provided with a generally split collet which is generally C-shaped when viewed axially having a longitudinally extending slot formed between two circumferential collet ends. The split collet is sufficiently elastic to enable the collet ends to be elastically biased toward one another enabling the split collet to constrict in size. The split collet first end is provided with an annular flange and the body cylindrical cavity is provided with a corresponding annular recess. The collet with the circumferential ends elastically biased together can be inserted into the body portion and upon release the split collet annular flange is oriented within the body annular recess to limit axial relative movement therebetween while allowing free relative rotation. In this embodiment the retainer member is provided by the cooperating annular flange and annular recess.

In both the first and second embodiment of the invention, elastic bands may be provided to orient the cutting tool coaxially with the shaft's central axis.

BRIEF DESCRIPTION OF THE DRAWINGS

FIG. 1 is an environmental view showing a router incorporating a router collet assembly of the present invention;

FIG. 2a is an exploded perspective view of a router collet assembly and associated router drive shaft;

FIG. 2b is an alternative split collet assembly which can be used in conjunction with the drive shaft and nut shown in FIG. 2a;

FIG. 3 is a cross-sectional side elevational view of the router collet assembly and a portion of the router drive shaft illustrated in FIGS. 1 and 2a;

BEST MODE FOR CARRYING OUT THE INVENTION

Figure 4:
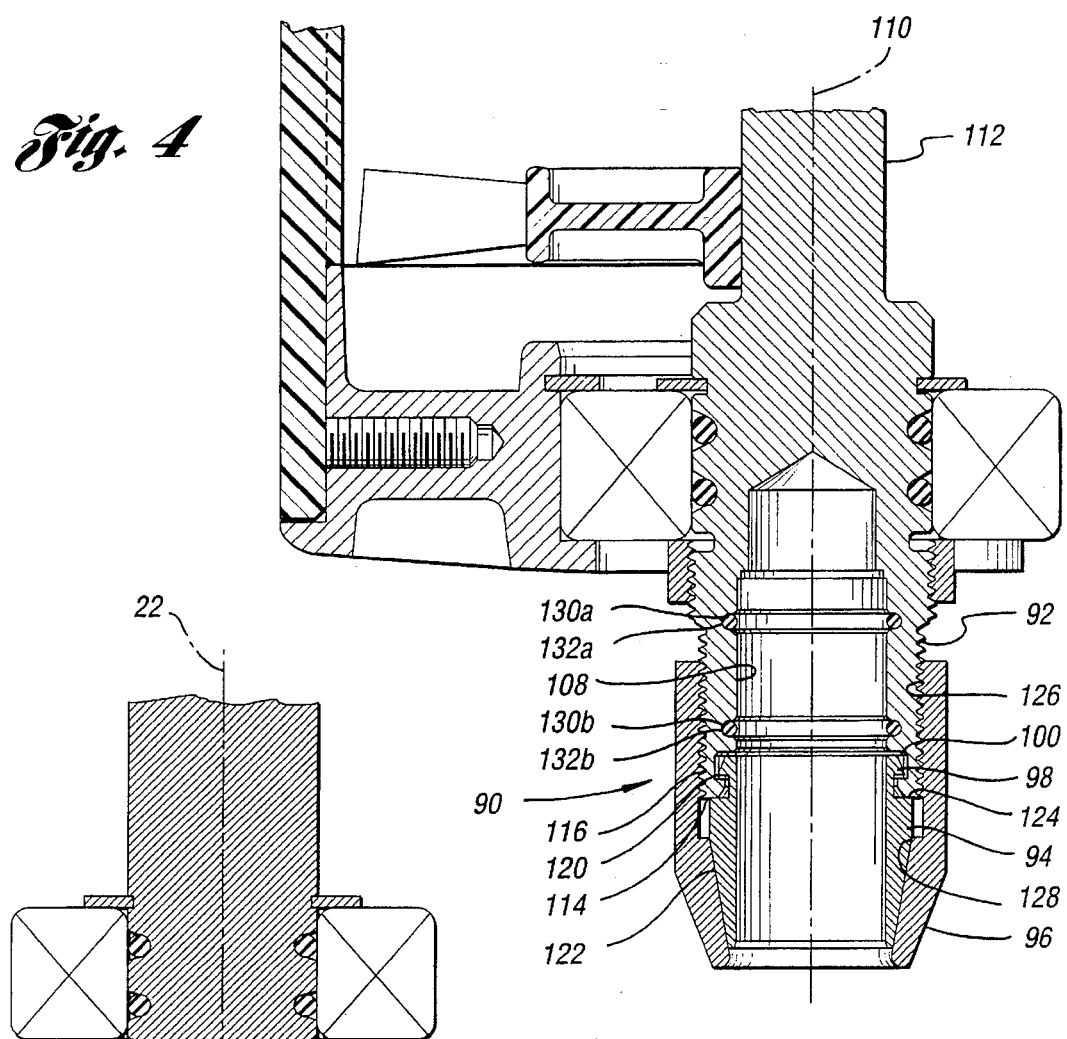
FIG. 4 is a cross-sectional side elevational view of a second embodiment of the invention.

FIG. 1 illustrates a router 10 having a motor housing 12, a base assembly 14 and an adjustment ring 16 for adjusting the orientation of the motor housing and base. Base 14 is provided with a flat annular base plate 18 for cooperating with a planar work surface. A router drive shaft 20 is driven by an electric motor not shown oriented within motor housing 12.

Drive shaft 20 is aligned along central axis 22 and provided with opposed ends 24 and 26. As the router is oriented in FIG. 1 end 24 is the lower end and end 26 is the upper end of drive shaft 20. However, it should be appreciated that the router can be used in a wide variety of angular orientations.

A router collet assembly 28 is driven by end 24 of drive shaft 20. A router collet assembly 28 is formed of four elements: body 30, split collet 32, nut 34 and a retainer provided by threaded fastener 36.

Figure 3:
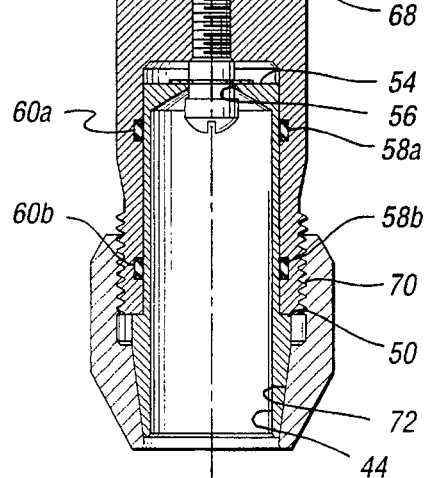

Body 30 in the embodiment shown in FIGS. 2a and 3 are integrally machined into end 24 of router drive shaft 20. It should be appreciated, of course, that the body 30 could alternatively form as a removable member attachable to a threaded end on the drive shaft. Whether the body is integrally formed or formed as a separate piece is simply a matter of design choice. The integral construction having an advantage as to cost and size. The separate piece construction having the advantage of being replaceable in the event the router collet assembly becomes damaged or worn.

Body 30 has a generally cylindrical circular cavity 38 formed therein aligned with central axis 22. Extending about surrounding circular cavity 38 is end face 40. Body 30 is further provided with a threaded outer peripheral surface 42. As shown in FIG. 3, the body is further provided with threaded central bore 68 aligned along central axis 22 and oriented in the bottom of generally cylindrical circular cavity 38.

Split collet 32 has a central cylindrical bore 44 sized to receive a circular cylindrical shank of a rotary cutting tool. The collet has a first end portion 46 having a circular cylindrical outer periphery which is sized to slip fit into body circular cylindrical cavity 38. The collet has a second end portion 48 forming a tapered frusto-conical outer surface. Intermediate the first or second end portions 46 and 48 is an annular shoulder 50 for abuttingly cooperating with body end face 40 as shown in FIG. 3. The collet has a pair of diametrically opposed slots 52a and 52b extending axially along a portion of the collet's length to enable the collet to be elastically flexed inwardly to grasp the shank of a rotary cutting tool. A router collet assembly 28 of the first embodiment utilizes a pair of slots which extend less than the full collet length. It should be appreciated, of course, that a greater or fewer number of slots can be utilized, however, two is preferred in the present embodiment.

As best seen in the cross-sectional side elevation in FIG. 3, collet 32 further includes a bottom plate 54 cooperating with the collet's second end portion 46 and located on one axial end of the split collet 32. Bottom plate 54 is provided with a central aperture 56 which is significantly smaller than cylindrical bore 44 and sized to receive shank portion 66 of threaded fastener 36 therethrough.

In the preferred embodiment of the invention illustrated in FIG. 3, a pair of annular elastic bands 58a and 58b are oriented with in a pair of corresponding annular recesses 60a and 60b machined into the generally circular cylindrical cavity 38 and body 30. Annular elastic bands 58a and 58b serve to coaxially align collet 32 within the generally circular cylindrical cavity 38 concentrically with central axis 22. It should be appreciated that elastic annular bands 58a and 58b are not necessary and a single elastic band or no elastic bands can be utilized if collet cost is a significant factor.

Threaded fastener 36 is provided by a left hand threaded screw having an enlarged head portion 62, a threaded portion 64 and the shank portion 66 therebetween. The shank portion 66 being smaller than the enlarged head is sized to fit within aperture 56 and collet end plate 54. Shank 66 is larger in diameter than the threaded portion 64 so that the shank will provide a positive stop when the threaded fastener is tightened into threaded bore 68 and body 30. Ideally, shank 66 is sized to receive a lock ring 70 which expands over and grips shank 66. Lock ring 70 serves to prevent threaded fastener 36 from being separated from collet 32 while allowing the collet to rotate freely relative to the threaded fastener and move axially a limited distance. Of course, lock ring 70 is not necessary. The lock ring, however, is quite convenient in that it can prevent a router user from inadvertently losing fastener 36 a non-standard left hand screw, when router collets are being changed.

Nut 34 has an axial bore extending therethrough having internally threaded region 70 for cooperating with the threaded surface 42 on the outer periphery of the body 30. The nut 34 is also provided with an internal frusto-conical surface 72 for cooperating with the external tapered frusto-conical outer surface 48 of collet 32. Frusto-conical surfaces 48 and 72 are oriented between 6 and 10 degrees relative to central axis 22 and preferably about 8 degrees. Nut 34 is formed from a hexagonal bar stock and retains a series of flats about its outer periphery to accommodate engagement with a wrench to tighten and loosen the nut relative to body 30. In order to hold drive shaft 20 stationary during the rotation of nut 34 shaft end 26 is provided with a pair of conventional flats for cooperating with a shaft lock which is not shown.

In operation nut 34 will be rotated counter-clockwise in an unloosening direction relative to body 30 viewing the router collet assembly axially from end 24 of shaft 20. With the nut loose, end collet 32 expands to its open position enabling the shank of a selected cutting tool to be inserted into generally circular cylindrical cavity 44 in collet 32. When the cutting tool is in the desired axial orientation, nut 34 is then rotated in a clockwise tightening direction relative to body 30 causing the nut to move axially toward the collet. The tapered frusto-conical surface 72 of nut 34 engages the corresponding frusto-conical surface 48 on the outer periphery of split collet 32 causing the collet to constrict so the bore of the collet tightly grips the shank of the rotary cutting tool. It should be noted that inward axial movement of collet 32 relative to body 30 is constrained by the abutment of annular shoulder 50 with body end face 40.

When it is desired to remove the rotary cutting tool, the router shaft 20 is constrained and nut 34 is rotated in the counter-clockwise direction. Initially nut 34, collet 32 and the cutting tool rotate together and move axially away from shaft 20. After some initial axial movement the head of threaded fastener 36 engages bottom plate 54 of collet 32 conical surface 72 and 48 will become separated enabling the collet's grip on the shank of the cutting tool to be released.

Using the router collet construction of the first embodiment of the invention, the split collet member, can be readily exchanged in order to select a split collet having the appropriate size cylindrical bore for the cutting tool intended to be used. In the North American market, for example, ¼ inch and ½ inch router shank diameters are common, while in Europe and in Japan, 6, 8 or 12 mm diameter router shanks are used frequently. Alternating sized router collet assemblies can be used with single router to accommodate a wide variety of rotary cutting tools.

FIG. 2b illustrates an alternative split collet assembly 74 having a generally circular cylindrical bore sized to receive a much smaller rotary cutting tool shank than collet 32 illustrated in FIG. 2a. Other than the diameter of cylindrical bore 76, the alternate split collet 74 is identical to split collet 32. As described previously with reference to split collet 32, a threaded fastener is provided which is securely affixed to the split collet by a lock ring in order to prevent the threaded fastener from becoming lost when router collets are being changed.

Collet 32 as well as collet 74 both have first end portions which have an axial length which is in excess of the diameter of the collet cylindrical bore and preferably the axial length is greater than 1 ½ times the cylindrical bore diameter in order to provide sufficient engagement with the shank of the rotary cutting tool to be held therein.

A second alternative router collet assembly embodiment is shown in FIG. 4 in a cross-sectional side elevational view. Unlike the first router collet assembly embodiment 28 where a separate retainer affixes collet 32 to body 30, router collet assembly 90 has a retainer formed by an annular flange 98 on split collet 94 which cooperates with an annular recess 100 formed in body 92. The cooperating annular flange and annular recess served to permit free relative rotation between collet 94 and body 92 and limited axial movement therebetween.

Figure 5:
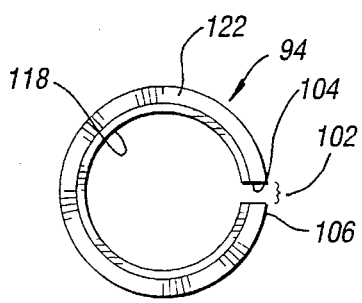
FIG. 5 is an axial end view of the C-shaped split collet shown in FIG. 4.

As can be seen from axial end view of collet 94 in FIG. 5, split collet 94 is generally C-shaped when viewed axially having a longitudinally extending slot formed between two circumferential ends 104 and 106 in the collet's periphery. The collet is formed of a springy steel material so that the collet can elastically flex as the circumferential collet ends 104 and 106 are biased together enabling the split collet to constrict in size sufficiently for the annular flange 98 to be nested within annular recess 100. Once inserted, the split collet expands, limiting their axial separation yet allowing free relative rotation. As illustrated in FIG. 4, the axial length of the annular recess 100 is greater than the axial length of annular flange 98 to provide the limited axial movement between collet 94 and body 92.

Body 92 is provided with a generally circular cylindrical cavity 108 aligned generally with central axis 110 of drive shaft 112. Like the first collet assembly embodiment 28, body 92 is provided with an end face 114 circumferentially surrounding the cylindrical cavity and a threaded outer peripheral surface 116. C-shaped split collet 94 is provided with a cylindrical bore 118 sized to receive a cylindrical shank of a selected cutting tool. A split collet has a first end portion 120 sized to be received within the outer most end of generally cylindrical cavity 108 to enable annular flange 98 to nest within annular recess 100. Split collet 90 like collet 32 described previously is provided with tapered frusto-conical outer surface 122 and an annular shoulder 124 for abuttingly cooperating with end face 114.

Nut 96 is substantially the same as nut 34 described previously and is provided with an axial bore extending therethrough having an internal threaded region 126 and a frusto-conical internal surface 128.

In operation, when nut 96 is rotated in a tightening direction, the nut moves inwardly toward the collet 94 causing the collet shoulder to move into abutting relation with body end face 114 whereupon further movement of the nut causes the collet to constrict upon the shank of the rotary cutting tool inserted therein. When the nut is loosened, the nut and the collet and cutting tool will initially move together away from the body 92 until annular flange 98 can no longer move axially relative to annular recess 100 whereupon the nut and collet will separate enabling the collet to relax its grip on the cutting tool shank.

As shown in FIG. 4 of the drawings, a pair of annular elastic bands 130a and 130b are oriented within a pair of annular grooves 132a and 132b machined into the interior wall of body generally circular cylindrical cavity 108. Grooves 132a and 132b are preferably spaced apart and served to concentrically center the shank of the cutting tool with a generally circular cylindrical cavity 108 formed in body 92. Generally circular cylindrical cavity 108 is sized to receive the shank of a conventionally tolerant cutting tool in a slip fit manner. With a nominal cutting tool shank diameter the generally cylindrical circular cavity 108 will have one to two thousandths of a diametrical clearance. Elastic bands 130a and 130b although not unnecessary for satisfactory operation of the present invention, help to maintain tool concentricity and further prevent the cutting tool from falling out when nut 96 is loosened.

Preferably, the region of the generally circular cylindrical cavity 108 which is dimensioned to closely correspond to the diameter of the shank of the rotary cutting tool will have an axial length greater than the cutting tool diameter. Similarly, split collet 96 will have an axial length greater than the cutting tool diameter in order to provide adequate support for the cutting tool during operation.

While this invention has been described in detail with particular reference to preferred embodiments thereof, it will be understood that variations and modifications can be effected within the spirit and scope of the invention as described and defined in the appended claims.

What is claimed:

1. A router collet assembly for removably attaching a cutting tool to an elongated router drive shaft rotatable about a central axis, the router collet assembly comprising:

a body having an end driven by the drive shaft, a generally circular cylindrical cavity formed therein aligned with the drive shaft central axis, an end face opposite the driven end surrounding the cylindrical cavity, and a threaded outer peripheral surface;

a split collet having a cylindrical bore sized to receive a cylindrical shank of a cutting tool, a first end portion sized to slip it into the body circular cavity, a second end portion provided with a tapered frusto-conical outer surface, and an annular shoulder intermediate the first and second end portions for abuttingly cooperating with the body end face;

a nut having an axial bore extending therethrough with an internal threaded region for cooperating with the body threaded surface and an internal frusto-conical surface for cooperating with the collet frusto-conical outer surface, wherein the rotation of the nut relative to the body in a tightening direction causes the nut to engage the collet and constrict the collet bore to grip a shank of the cutting tool, and the rotation of the nut in an opposite loosening direction enables the collet to release the shank of the cutting tool; and a retainer for retaining the collet and body together while permitting free rotation about the central axis and limited axial movement, wherein the collet can initially move rotationally and axially a limited distance with the nut as the nut is loosened before the retainer limits further axial movement causing the nut and collet to separate and the collet's grip on the cutting tool shank to be released.

2. The router collet assembly of claim 1 wherein:

the split collet is further provided with a bottom plate located adjacent the second end portion having a central aperture significantly smaller than the cylindrical cavity;

the body is further provided with a axially aligned threaded aperture; and said retainer comprises a threaded fastener having an enlarged head for cooperating with the split collet bottom plate, and a threaded portion for cooperating with the body threaded aperture.

3. The router collet assembly of claim 2 wherein the split collet first end portion has an axial length greater than the diameter of the cylindrical cavity formed therein.

4. The router collet assembly of claim 2 further comprising:

an annular elastic band having an inside diameter for cooperation with the split collet and an outside diameter for cooperation with the body;

wherein the body's generally cylindrical cavity is further provided with an annular groove sized to receive and axially locate the elastic band to maintain the split collet concentric with the shaft central axis.

5. The router collet assembly of claim 2 further comprising:

a pair of annular elastic bands each having an inside diameter for cooperation with the split collet and an outside diameter for cooperation with the body;

wherein the body's generally cylindrical cavity is further provided with a pair of axially spaced apart annular grooves each sized to receive an axially locate one of the annular elastic bands to maintain the split collet concentric with the shaft axis.

6. The router collet assembly of claim 2 wherein the threaded fastener is provided with a shank portion intermediate the enlarged head and the threaded portion, the shank portion being sized to fit within the central aperture of the collet bottom plate and larger than the threaded portion to provide a stop limiting the axial position of the threaded fastener and the body and appropriately locating the threaded fastener enlarged head relative to the split collet to provide limited axial movement between the split collet and body, a lock ring sized to engage the shank portion at a location spaced from the enlarged head to orient the collet bottom plate therebetween, enabling the threaded fastener to rotate relative to the split collet and move within a limited axial range, yet preventing threaded fastener and slit collet from being separated from one another when the slit collet is removed from the body.

7. The router collet assembly of claim 2 further comprising an alternate split collet having a cylindrical bore of a diameter different than that of the split collet in order to receive an alternately sized cutting tool shank, the alternate split collet having a first end portion sized to slip it into the body circular cavity, a second end portion provided with a tapered frusto-conical outer surface, and an annular shoulder intermediate the first and second end portions for abuttingly cooperating with the body end face, wherein a user can selectively install either the split collet or the alternate split collet within the body's generally circular cylindrical cavity.

8. The router collet assembly of claim 1 wherein said split collet is generally C-shaped when viewed axially, having a longitudinally extending slot formed between two circumferential collet ends, the split collet being sufficiently elastic to enable the circumferential collet ends to be elastically biased toward one another enabling the split collet to constrict in size, the first end portion of the split collet being provided with an annular flange, and the generally cylindrical cavity of the body being provided with a corresponding annular recess, so that the split collet with the circumferential ends elastically biased together can be inserted into the body and upon release, the split collet annular flange is oriented within the body annular recess, the split collet flange and the body recess collectively providing the retainer for retaining the split collet and body together while permitting free relative rotation about a central axis while allowing limited axial movement therebetween.

9. The router collet assembly of claim 8 wherein the generally circular cylindrical cavity formed in the body has a tool shank engagement portion sized to slip fit with the shank of the cutting tool, wherein the tool shank engagement portion has an axial length which is greater than the cylindrical cavity diameter.

10. The router collet assembly of claim 9 further comprising an annular elastic band and wherein said tool shank engagement portion is provided with an annular recess, sized to receive the elastic band to cooperate with the shank of the cutting tool to orient the cutting tool concentric relative to the central axis.

11. The router collet assembly of claim 1 wherein the body is integrally formed on an end of the router drive shaft.

12. A router collet assembly for removably attaching a cutting tool to an elongated router drive shaft rotatable about a central axis, the router collet assembly comprising:

a body having an end driven by the drive shaft, a generally circular cylindrical cavity formed therein aligned with the drive shaft central axis, an end face opposite the drive end surrounding the cylindrical cavity, an internally threaded bore located along the central axis and oriented within the center of the generally circular cylindrical cavity, and a threaded outer peripheral surface;

a split collet having a cylindrical bore sized to receive a cylindrical shank of a cutting tool, a first end portion sized to slip it into the body circular cavity, a bottom plate with a central aperture located adjacent an axial end of the collet, a second end portion provided with a tapered frusto-conical outer surface, and an annular shoulder intermediate the first and second end portions for abuttingly cooperating with the body end face;

a nut having an axial bore extending therethrough with an internal threaded region for cooperating with the body threaded surface and an internal frusto-conical surface for cooperating with the split collet frusto-conical outer surface, wherein the rotation of the nut relative to the body in a tightening direction causes the nut to engage the split collet and constrict the split collet bore to grip a shank of the cutting tool, and the rotation of the nut in an opposite loosening direction enables the collet to release the shank of the cutting tool; and a threaded fastener having an enlarged head for cooperating with the split collet bottom plate and a threaded portion for attachment to the body threaded aperture, thereby retaining the collet and body together while permitting free rotation about the central axis and limited axial movement, so that the split collet can initially move rotationally and axially a limited distance with the nut as the nut is loosened before the threaded fastener limits further axial movement of the split collet causing the nut and collet to separate and the collet's grip on the cutting tool shank to be released.

13. The router collet assembly of claim 12 further comprising an annular elastic band wherein the tool shank engagement portion is provided with an annular recess, sized to receive the elastic band which cooperates with the shank of the cutting tool to orient the cutting tool concentric relative to the central axis.

14. The router collet assembly of claim 12 wherein the body is integrally formed on an end of the router drive shaft.

15. The router collet assembly of claim 12 wherein the threaded fastener is provided with a shank portion intermediate the enlarged head and the threaded portion, the fastener shank portion being sized to fit within the collet bottom plate central aperture and larger than the fastener threaded portion to provide a stop limiting the axial position of the threaded fastener and the body and appropriately locating the threaded fastener enlarged head relative to the collet to provide limited axial movement between the collet and body, the threaded fastener having a shank portion and a lock ring sized to engage the shank portion at a location spaced from the enlarged head to orient the split collet bottom plate therebetween, enabling the threaded fastener to rotate relative to the collet and move within the limited axial range, yet preventing threaded fastener and collet from being separated from one another when the collet is removed from the body.

16. A router collet assembly for removably attaching a cutting tool to an elongated router drive shaft rotatable about a central axis, the router collet assembly comprising:

a body having an end driven by the drive shaft, a generally circular cylindrical cavity formed therein aligned with the drive shaft central axis, an annular groove formed in the cylindrical cavity, an end face opposite the driver end surrounding the cylindrical cavity, and a threaded outer peripheral surface;

a split collet of generally C-shape when viewed axially, having a longitudinally extending slot between two circumferential collet ends, the split collet being sufficiently elastic to enable the circumferential collet ends to be elastically biased toward each other enabling the split collet to constrict in size, the split collet having a cylindrical bore sized to receive a cylindrical shank of a cutting tool, a first end portion having an annular flange sized to slip it into the body circular cylindrical cavity when the split collet circumferential collet ends are elastically biased together and to expand into the annular groove formed within the cylindrical cavity, a second end portion provided with a tapered frusto-conical outer surface, and an annular shoulder intermediate the first and second end portions for abuttingly cooperating with the body end face;

a nut having an axial bore extending therethrough with an internal threaded region for cooperating with the body threaded surface and an internal frusto-conical surface for cooperating with the collet frusto-conical outer surface, wherein the rotation of the nut relative to the body in a tightening direction causes the nut to engage the split collet and constrict the split collet bore to grip a shank of the cutting tool, and the rotation of the nut in an opposite loosening direction enables the split collet to release the shank of the cutting tool; and wherein the split collet annular flange and the body annular groove cooperate with one another to enable the split collet to rotate relative to the body and to move axially a limited amount so that the split collet can initially move rotationally and axially with the nut as the nut is loosened before the engagement of the split collet annular flange and the body angular groove limit further axial movement causing the split collet and nut to separate and the split collet's grip and the cutting tool shank released.

17. The router collet assembly of claim 16 further comprising an annular elastic band, and wherein said body cylindrical cavity is provided with an annular recess, sized to receive the elastic band, so that the elastic band cooperates with the shank of the cutting tool to orient the cutting tool concentric relative to the central axis.

18. The router collet assembly of claim 16 wherein the body is integrally formed on an end of the router drive shaft.

* * * * *

UNITED STATES PATENT AND TRADEMARK OFFICE
CERTIFICATE OF CORRECTION

PATENT NO. : 5,620,188
DATED : April 15, 1997
INVENTOR(S) : McCurry et al.

It is certified that error appears in the above-identified patent and that said Letters Patent is hereby corrected as shown below:

Column 6, line 64, after the word " with ", delete " a "

and insert -- an --.

Column 7, line 22, after the word " receive ", delete " an "

and insert -- and --.

Signed and Sealed this

Twenty-seventh Day of January, 1998

Attest:

BRUCE LEHMAN

Attesting Officer

Commissioner of Patents and Trademarks